United States Patent [19]
Tesch

[11] 4,168,884
[45] Sep. 25, 1979

[54] VARIFOCAL OBJECTIVE WITH MECHANISM FOR CLOSEUP FOCUSING

[75] Inventor: Karl Tesch, Bad Kreuznach, Fed. Rep. of Germany

[73] Assignee: Jos. Schneider & Co. Optische Werke Kreuznach, Bad Kreuznach, Fed. Rep. of Germany

[21] Appl. No.: 902,160

[22] Filed: May 2, 1978

[30] Foreign Application Priority Data

May 25, 1977 [DE] Fed. Rep. of Germany ....... 2723540

[51] Int. Cl.² .................. G02B 15/18; G02B 7/10
[52] U.S. Cl. ..................... 350/187; 350/255
[58] Field of Search ................. 350/187, 186

[56] References Cited
U.S. PATENT DOCUMENTS

| | | | |
|---|---|---|---|
| 3,613,544 | 10/1971 | Plihal et al. | 350/187 |
| 3,655,271 | 4/1972 | Suzuki | 350/187 |
| 3,659,921 | 5/1972 | Hirose et al. | 350/186 |
| 3,661,445 | 5/1972 | Someya | 350/186 |
| 3,884,555 | 5/1975 | Suwa et al. | 350/187 |
| 4,054,372 | 10/1977 | Schröeder | 350/187 |

*Primary Examiner*—Jon W. Henry
*Attorney, Agent, or Firm*—Karl F. Ross

[57] ABSTRACT

A varifocal objective with a front component, axially shiftable for focusing purposes, and with a second and third component, axially displaceable by camming grooves in a control sleeve for changing the focal length, is provided with a coupling ring centered on the objective axis which is axially entrained by the lens mount of the front component. During normal operation, the coupling ring is indexed in a disengagement position. When the front component is in its infinity position and the control sleeve has cammed the second and third components into their wide-angle position, the coupling ring is manually rotatable into an engagement position in which it links the lens mount of the first component with that of the third component for joint axial shifting into a macro range by the focusing drive; such shifting is facilitated by an axial slot in the control sleeve preventing rotation of the latter in that range.

7 Claims, 3 Drawing Figures

VARIFOCAL OBJECTIVE WITH MECHANISM FOR CLOSEUP FOCUSING

FIELD OF THE INVENTION

My present invention relates to a varifocal or zoom-type objective for a photographic or cinematographic camera in which an axial shift of an objective component, normally serving as a compensator to maintain a constant image-plane position during changes in focal length, facilitates the taking of closeup pictures in a macro range.

BACKGROUND OF THE INVENTION

Varifocal objectives of this type are well known per se, e.g. from U.S. Pat. Nos. 3,655,271 and 3,891,304. Reference in this connection may also be made to German printed specifications Nos. 2,023,804 and 2,029,254 as well as German published applications Nos. 2,634,941 and 2,634,964.

The term "macro range" encompasses distances closer than a normal focusing range, usually within limits giving image scales between 1:10 and 1:1. Whereas normal zooming involves the simultaneous displacement of the aforementioned compensator component (generally the third component as counted from the front or object side) and of the immediately preceding variator component (commonly the second one), the shift into the macro range is ordinarily carried out by the compensator component alone. The first or front component, considered stationary for the purpose of changing the overall focal length, is limitedly axially shiftable for focusing in both the normal and macro ranges.

OBJECT OF THE INVENTION

The object of my present invention is to provide a simple mechanism for enabling an axial shifting of the third or compensator component of a varifocal lens group, independently of the associated second or variator component, to facilitate the projection of images from objects closer than the normal focusing range upon the plane of a receiving surface such as that of a photosensitive film.

SUMMARY OF THE INVENTION

I realize this object, in accordance with my present invention, by the provision of a coupling element—preferably a milled ring—projecting outwardly from a lens barrel in which at least the first three components of a varifocal objective are located, this coupling element being manually rotatable about the objective axis between two alternate positions. A link member inside the lens barrel is connected with the coupling element for joint rotation therewith and is further connected with the first lens mount, carrying the front component of the objective, for axial entrainment thereby. This link member and the third lens mount, carrying the compensator component, are provided with complementary formations which are disengaged from each other in one of the aforementioned alternate positions but are aligned with each other in predetermined positions of a setting means serving for focusing and a camming means serving for focallength adjustment. Upon such alignment, a rotation of the coupling element into its alternate position interengages the complementary formations of the link member and of the third lens mount to facilitate a joint axial shifting of the front and compensator components into the macro range under the control of the aforementioned setting means.

BRIEF DESCRIPTION OF THE DRAWING

The above and other features of my invention will now be described in detail with reference to the accompanying drawing in which.

SPECIFIC DESCRIPTION

Figure 1:
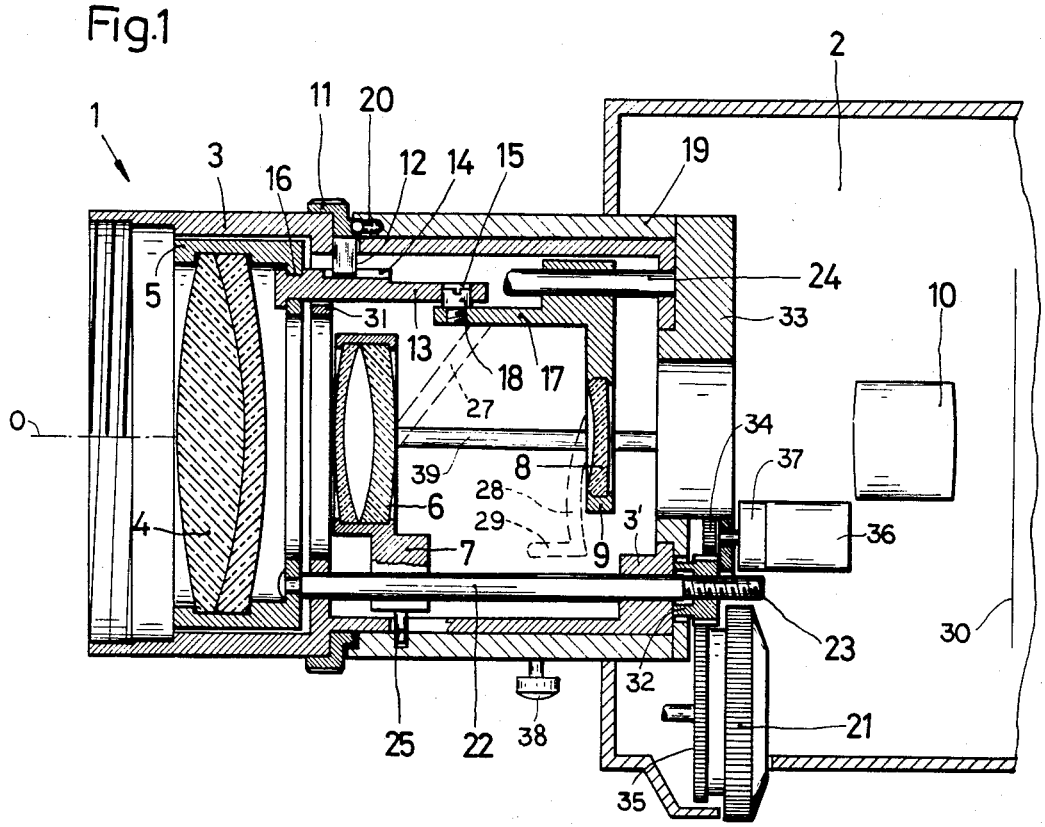
FIG. 1 is an axial sectional view of a cinematographic camera provided with an objective embodying my invention.

The camera shown in the drawing comprises a varifocal or zoom-type objective, generally designated 1, and a camera body or housing 2. The objective 1 is provided with a lens barrel 3 which projects from the camera housing 2 and is centered on an optical axis O. Also centered on this axis are several lens members constituting a positively refracting front component 4, two negatively refracting intermediate components 6, 8 and a stationary rear component 10. The latter, disposed outside lens barrel 3 within housing 2, consists of a plurality of lenses not illustrated individually.

Components 6 and 8 are provided with respective lens mounts 5, 7 and 9 which are individually displaceable along axis O. The shifting of lens mount 5 for focusing purposes is carried out by a mechanism similar to that disclosed and claimed in commonly owned U.S. patent application Ser. No. 894,031 filed Apr. 6, 1978 by Karl-Heinz Holderbaum. The focusing mechanism comprises an axially extending guide rod 22 which is slidably and nonrotatably received in an inner annular flange 3' of lens barrel 3 and terminates inside housing 2 in a rear extremity 23 carrying male threads matingly engaged by a captive nut 32. This nut, held against axial displacement by the flange 3' and an end wall 33, carries external gear teeth in mesh with a pinion 34 and with a toothed wheel 35. Pinion 34 can be driven by a reversible motor 36, via a slipping clutch 37, whereas wheel 35 is rigid with a milled setting wheel 21 which is rotatable about an axis parallel to optical axis O. Setting wheel 21 may be provided with two distance scales relating to a normal focusing range and to a macro range, respectively. Motor 36 is energizable from a nonillustrated power supply, e.g. as described in commonly owned U.S. Pat. No. 3,165,044.

As disclosed in the above-identified Holderbaum application, lens mount 5 can be stabilized with the aid of an additional and preferably shorter guide rod not shown.

Figure 3:
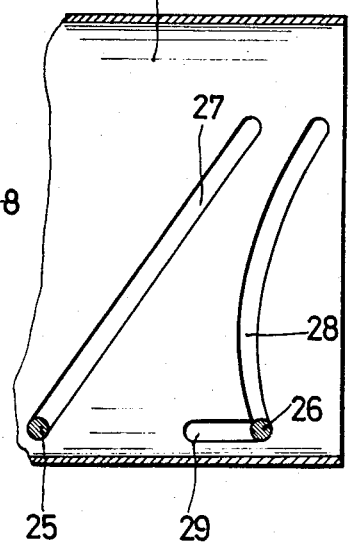
FIG. 3 is an axial sectional view of part of a camming sleeve used on the objective.

Lens mounts 7 and 9, carrying the variator component 6 and the compensator component 8, are displaceable in a manner well known per se by the rotation of a sleeve 19, provided for this purpose with a knob 38, which has camming grooves 27 and 28 engaged by respective pins 25 and 26 (see FIG. 3) on these lens mounts, the cam-follower pins passing through an axially extending slot 39 of lens barrel 3. Lens mounts 7 and 9 are slidably supported on axially extending guide rods including the rod 22 and at least one other rod 24.

In accordance with my present invention, a milled coupling ring 11 projects outwardly from an annular groove in lens barrel 3 just ahead of camming sleeve 19.

Figure 2:
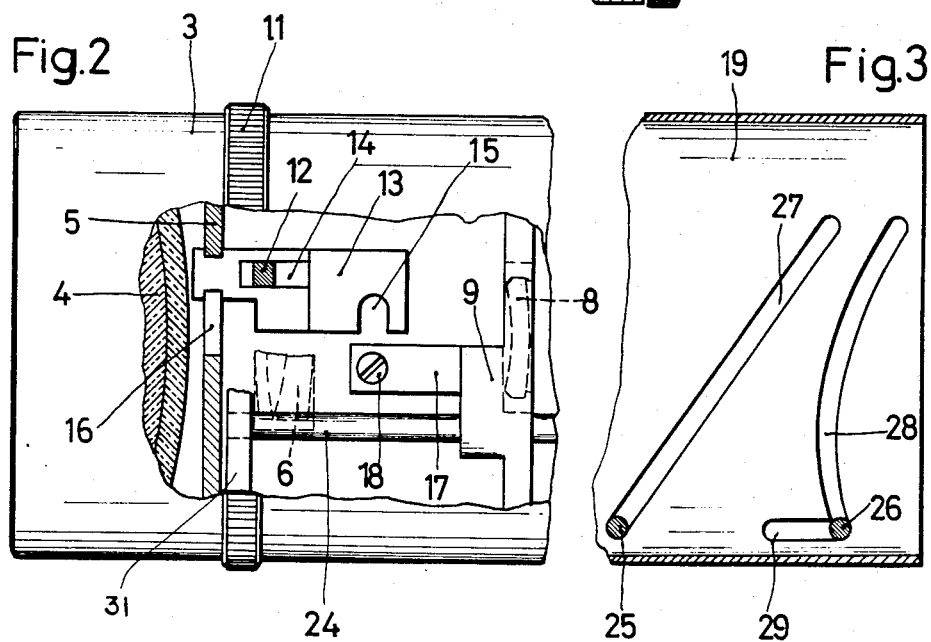
FIG. 2 is a fragmentary top view, with parts broken away, of the objective shown in FIG. 1.

A lug 12 rigid with ring 11 extends inwardly through an arcuate slot in the lens barrel and engages in an axially extending slot 14 of a link member 13 whose front end is received in an arcuate cutout 16 of lens mount 5 centered on axis O. Link member 13 is peripherally displaceable inside cutout 16 between a normal angular position, shown in FIG. 2, and an alternate position in which a recess 15 on a rear part of that member is engaged by a stud 18 on a forward extension 17 of lens mount 9. A rotation of ring 11 into this alternate position is evidently not possible unless link member 13 and extension 17 are aligned with each other as illustrated in FIG. 2. Such alignment occurs when the camming sleeve 19 is in its limiting position at the wide-angle end of the varifocal range, with pins 25 and 26 lying at the lower ends of their cam tracks 27 and 28 as viewed in FIG. 3, and when setting wheel 21 has retracted the lens mount 5 into its extreme right-hand position to focus the objective on the distal end of the normal range, generally infinity.

If, under these circumstances, coupling ring 11 is rotated into its alternate position to interengage the complementary formations 15 and 18 of member 13 and lens mount 9, rotation of wheel 21 results in a joint axial displacement of objective components 4 and 8. Such displacement is facilitated by the provision of a spur 29 extending from the lower end of the rear of cam track 28, the entry of pin 26 into that spur preventing any rotation of camming sleeve 19. The forward shifting of compoents 4 and 8 by means of setting wheel 21 focuses the objective upon objects in the macro range whose images are thereby projected upon a film plane 30.

Ring 11 is yieldably retained in its alternate or coupling position by indexing means here shown as a ball check 20 lodged in camming sleeve 19. Thus, rotation of sleeve 19 from the position of FIG. 3 in the direction of the larger focal lengths automatically decouples the link member 13 from lens mount 9.

Although the manual control of lens mount 5 by a setting wheel 21 on the camera body 2 is very convenient, the illustrated arrangement could be modified to replace the wheel 21 by a focusing ring on the forward end of the lens barrel as disclosed and claimed in commonly owned U.S. patent application Ser. No. 896,588 filed 14 Apr. 1978 by Paul Himmelsbach.

I claim:

1. In a camera comprising a housing, a lens barrel projecting from said housing, said lens barrel being centered on an optical axis, and an objective centered on said axis, said objective including a front component held in a first lens mount, a variator component held in a second lens mount and a compensator component held in a third lens mount, said lens mounts being axially shiftable in said lens barrel, camming means operatively coupled with said second and third lens mount for axially shifting same to change the focal length of the objective between a wide-angle end and a telephoto end of a varifocal range while keeping an image plane of the objective coincident with a receiving surface, and setting means independent of said camming means coupled with said first lens mount for axially shifting same to project upon said receiving surface the images of objects located at different distances from the camera within a normal focusing range, the combination therewith of a coupling element projecting outwardly from said lens barrel for manual rotation about said axis between two alternate positions, and a link member in said lens barrel connected with said element for joint rotation and with said first lens mount for axial entrainment thereby, said link member and said third lens mount being provided with complementary formations disengaged from each other in one of said alternate positions but aligned with each other in predetermined positions of said setting means and said camming means for enabling interengagement of said formations upon a rotation of said element into the other alternate position thereof, such interengagement facilitating a joint axial shifting of said front and compensator components into a macro range under the control of said setting means to project upon said receiving surface the images of objects closer than said normal focusing range.

2. The combination defined in claim 1 wherein said element is a ring held in said lens barrel against axial movement.

3. The combination defined in claim 2 wherein said first lens mount is provided with an arcuate cutout centered on said axis, said link member having a front end projecting into said cutout with freedom of peripheral displacement relative to said first lens mount, said link member further having an axial slot engaged by an inward projection of said ring.

4. The combination defined in claim 1 or 3 wherein said camming means comprises a rotatable sleeve centered on said axis and provided with front and rear tracks respectively engaged by cam followers on said second and third lens mounts, said rear track having an axially extending spur enabling the axial shifting of said third lens mount by said setting means in a predetermined position of said sleeve while locking the latter against rotation in said macro range.

5. The combination in claim 4 wherein said predetermined positions of said setting means are at a distal end of said normal focusing range and at said wide-angle end of the varifocal range, respectively.

6. The combination defined in claim 4 wherein said element and said sleeve adjoin each other and are provided with indexing means yieldably connecting said element in said other alternate position with said sleeve in said predetermined position thereof.

7. The combination defined in claim 1 wherein said setting means comprises a guide rod extending axially rearwardly from said first lens mount, said guide rod terminating in a threaded extremity within said housing, a captive nut in said housing meshing with said extremity, and drive means for rotating said nut.

* * * * *